(12) United States Patent
Drussel et al.

(10) Patent No.: US 6,705,446 B2
(45) Date of Patent: Mar. 16, 2004

(54) AUTOMATIC CLUTCH WITH MANUAL OVERRIDE CONTROL MECHANISM

(75) Inventors: Douglas W. Drussel, Sedalia, CO (US); G. Michael Wilfley, Cherry Hills Village, CO (US)

(73) Assignee: Drussel Wilfley Design, LLC, Denver, CO (US)

( * ) Notice: Subject to any disclaimer, the term of this patent is extended or adjusted under 35 U.S.C. 154(b) by 173 days.

(21) Appl. No.: 09/877,518

(22) Filed: Jun. 7, 2001

(65) Prior Publication Data

US 2002/0185355 A1 Dec. 12, 2002

(51) Int. Cl.[7] .............................. B62M 9/00
(52) U.S. Cl. .................. 192/83; 192/96; 192/105 B
(58) Field of Search .................. 192/83, 105 C, 192/103 A, 105 B, 96; 180/230

(56) References Cited

U.S. PATENT DOCUMENTS

| | | | |
|---|---|---|---|
| 1,743,170 A | | 1/1930 | Vail |
| 2,412,331 A | | 12/1946 | Grren |
| 2,555,860 A | * | 6/1951 | Reed ......................... 192/3.51 |
| 2,717,674 A | | 9/1955 | Crichton |
| 2,721,639 A | | 10/1955 | Miller |
| 3,001,623 A | | 9/1961 | Fawick |
| 3,003,608 A | * | 10/1961 | Biraden ......................... 192/83 |
| 3,215,234 A | | 11/1965 | Hirano |
| 3,265,172 A | | 8/1966 | Atsumi et al. |
| 3,762,519 A | | 10/1973 | Bentley |
| 3,842,954 A | | 10/1974 | Honemann |
| 3,939,734 A | | 2/1976 | Blanchette et al. |
| 4,457,185 A | | 7/1984 | Yoshida et al. |
| 4,518,070 A | | 5/1985 | Ooka |
| 4,576,269 A | * | 3/1986 | Hamane et al. ......... 192/103 A |
| 4,592,458 A | * | 6/1986 | Matsuki et al. ............... 192/83 |
| 4,690,258 A | | 9/1987 | Teraoka et al. |
| 4,732,252 A | | 3/1988 | Kittel |
| 4,986,403 A | | 1/1991 | Tipton |
| 5,033,598 A | * | 7/1991 | Tipton ..................... 192/70.24 |
| 5,361,882 A | | 11/1994 | Tipton |
| 5,423,406 A | * | 6/1995 | Antonov ................. 192/103 A |
| 5,441,137 A | | 8/1995 | Organek et al. |
| 5,733,217 A | * | 3/1998 | Naraki et al. ............... 475/258 |

* cited by examiner

*Primary Examiner*—Saul Rodriquez
(74) *Attorney, Agent, or Firm*—John E. Reilly

(57) ABSTRACT

An automatic clutch for automotive and other applications employs a control rod to manually control engagement and disengagement of the clutch independently of its speed of rotation, and in one form of invention can be employed in manual start motorcycles to engage the clutch for bump-starting purposes before the engine is up to speed, and in an alternate form a control rod can be employed in electrically started bikes to lock the clutch against engagement whether or not the engine is up to the speed required for automatic engagement of the clutch. The control rod may either extend through the transmission shaft from one end of the clutch housing or may extend through the opposite end of the clutch housing, and in certain applications the hereinbefore described control rods can be combined to selectively control bumpstarting to manually effect clutch engagement or as a locking mechanism to prevent clutch engagement.

39 Claims, 10 Drawing Sheets

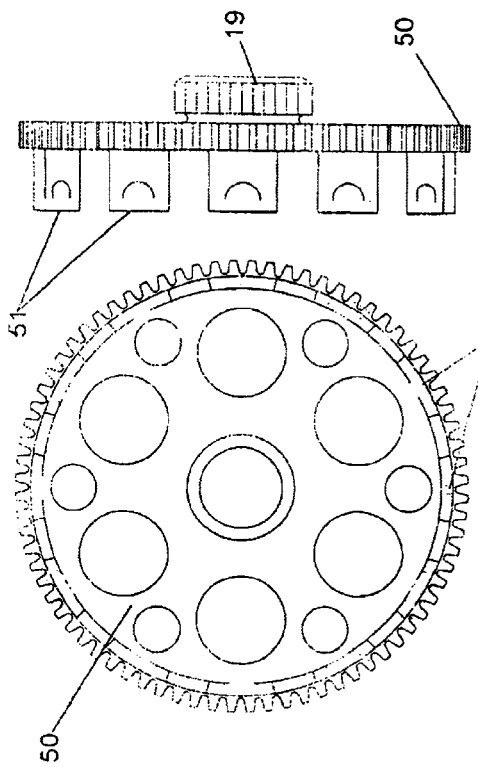
FIG. 6
FIG. 7
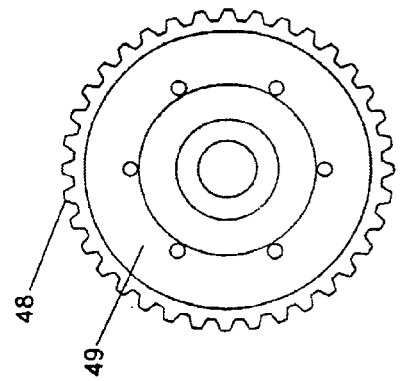
FIG. 5
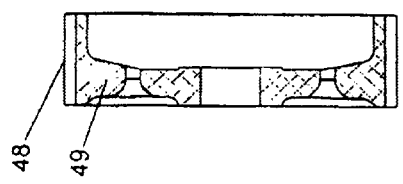
FIG. 4
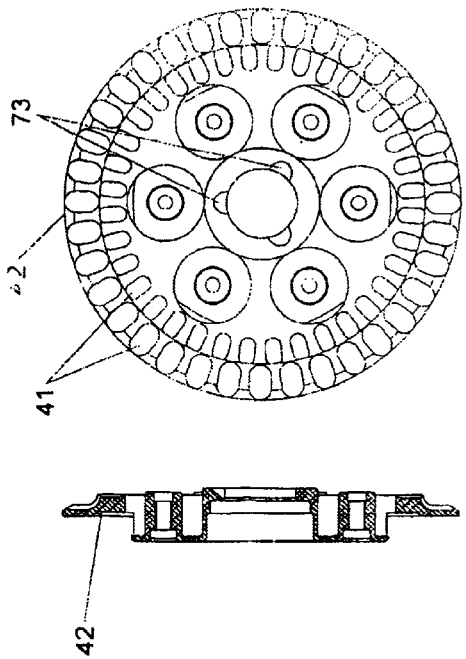
FIG. 11
FIG. 10
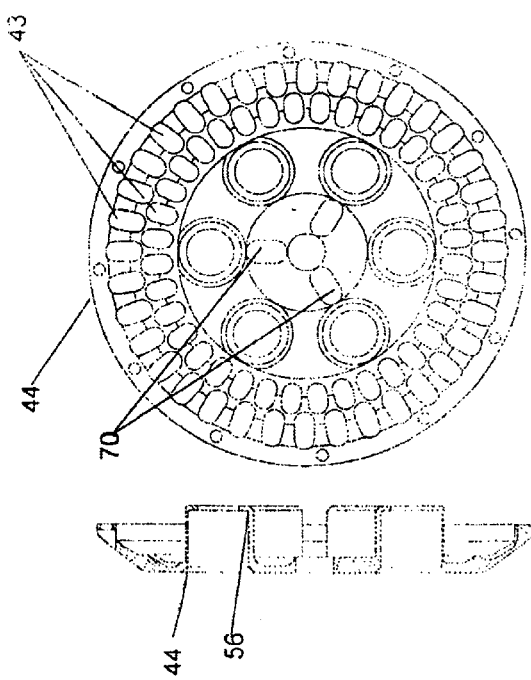
FIG. 9
FIG. 8

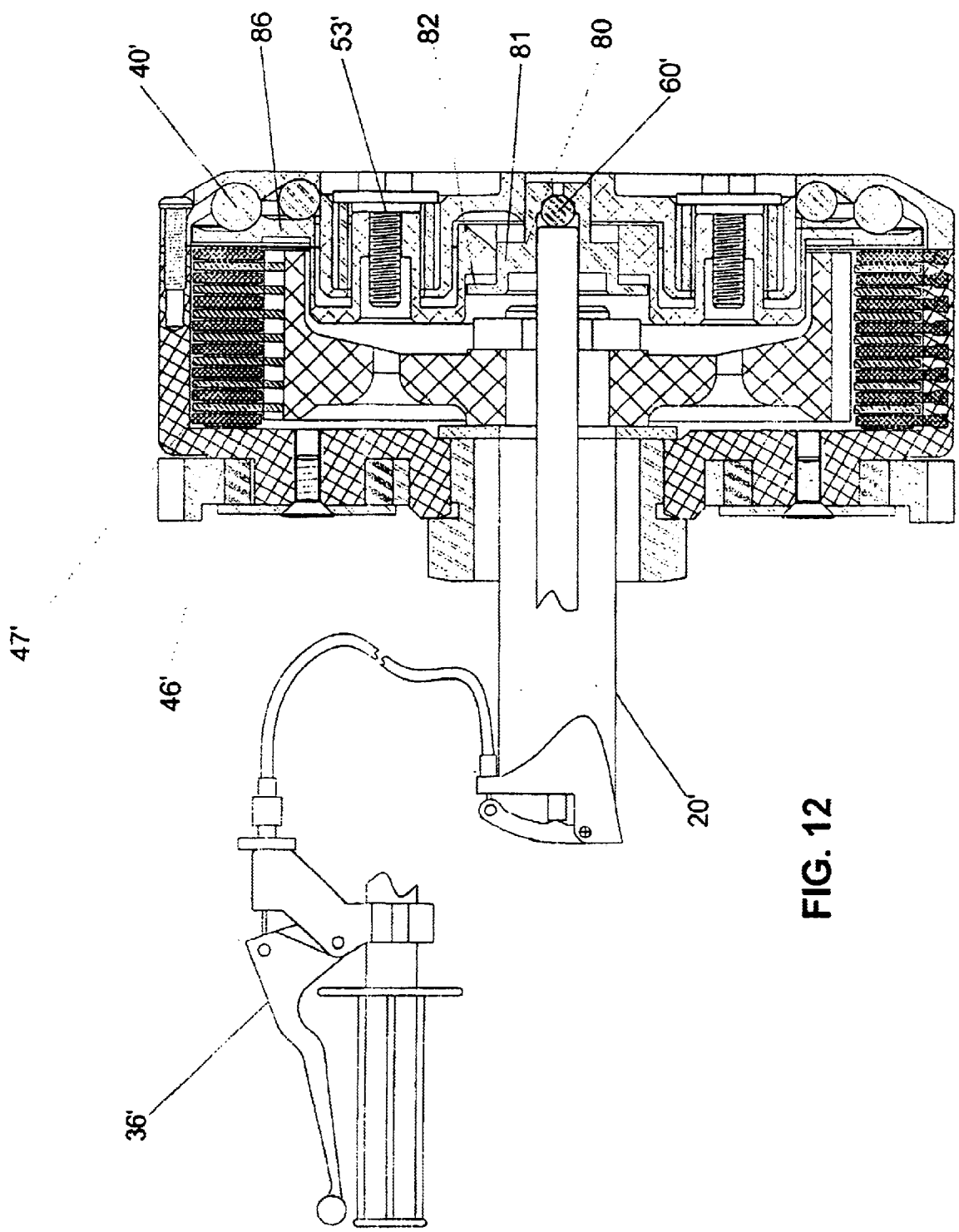

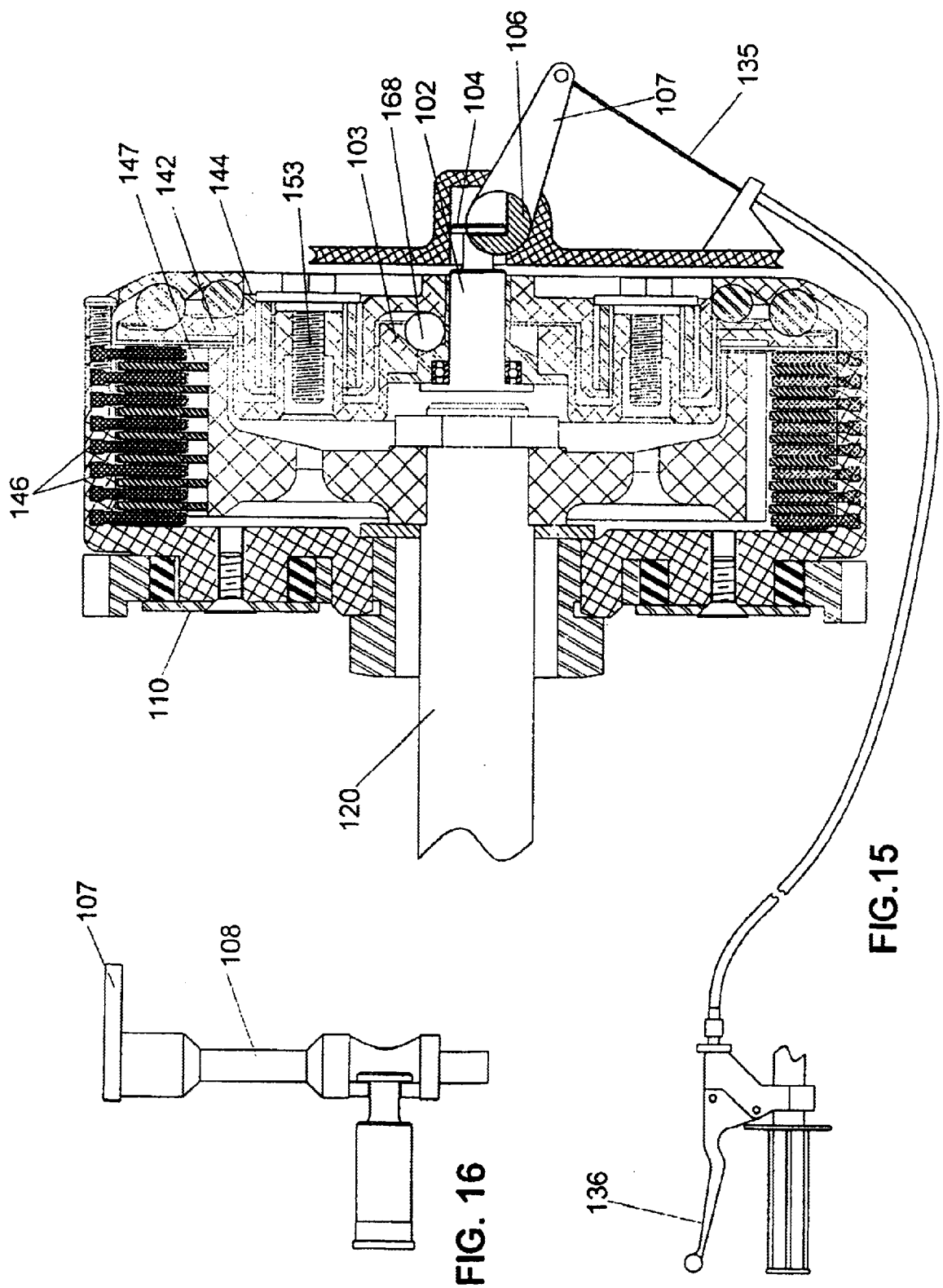

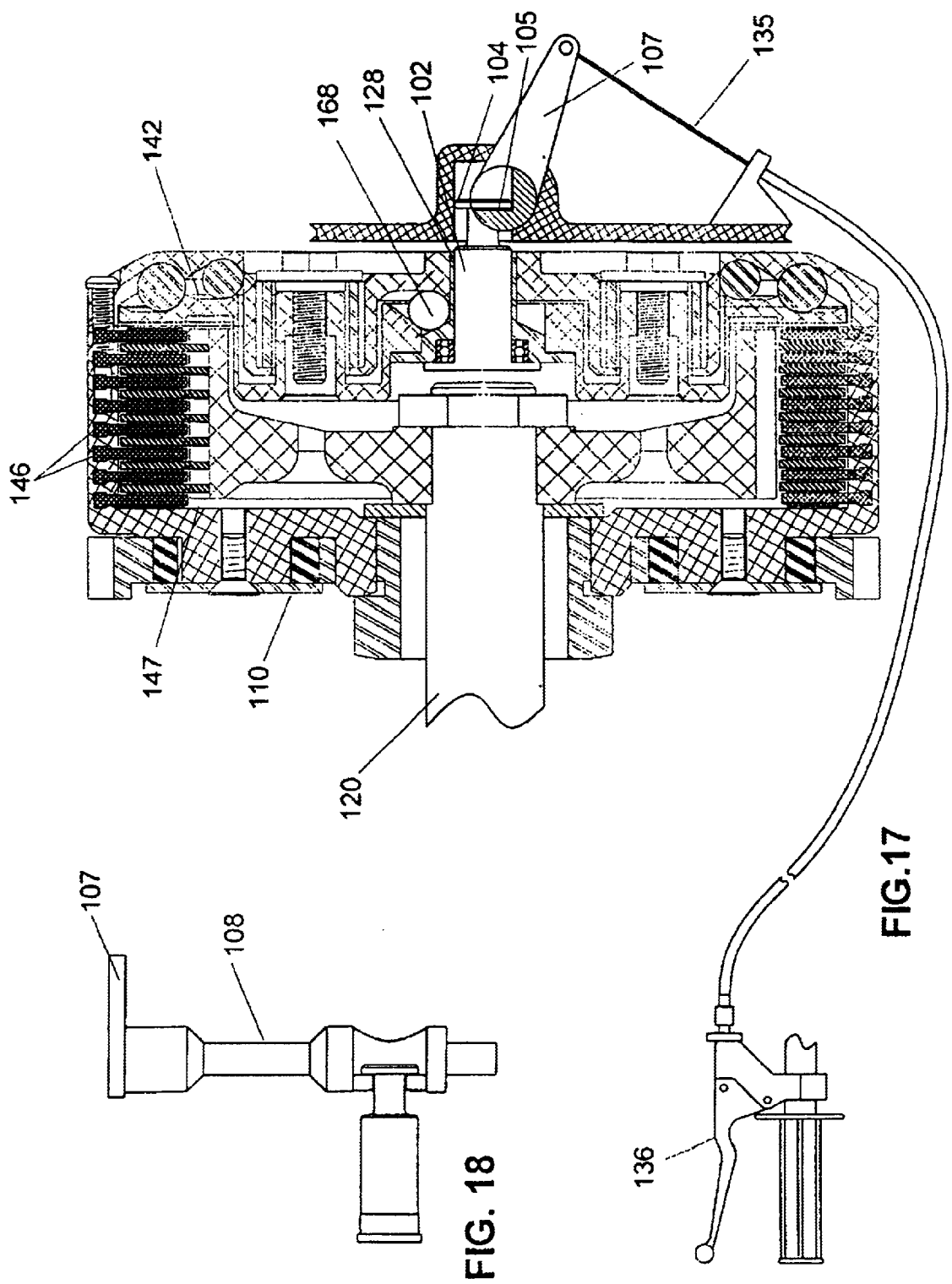

US 6,705,446 B2

AUTOMATIC CLUTCH WITH MANUAL OVERRIDE CONTROL MECHANISM

BACKGROUND AND FIELD OF INVENTION

This invention relates to automatic clutches adapted for use with a motive power source, and more particularly relates to a novel and improved automatic centrifugal clutch with a manual override control mechanism for motorcycles.

Motorcycles employ internal combustion engines either of the two-stroke or four-stroke variety, the fuel being ignited by an electric starter to cause the pistons to advance through their respective cylinders and to turn the engine crankshaft via a connecting rod which joins the piston and crankshaft together. The crankshaft converts the up and down movement of the piston to a circular motion which operates through a gear or chain reduction to power a pinion into the primary drive gear on a clutch housing. This permits the rider to disconnect the engine from the transmission in order to shift from one gear to another. The clutch itself is operated by a hand lever so as to allow power to be fed gradually from the engine to the gearing or to be disconnected for gear changing. Also, in the standard motorcycle, a gear shift is controlled by a foot lever to engage or disengage the transmission depending upon whether one wants to idle or cause the gears to impart rotation of the crankshaft into the rear wheel. In most street bikes an electric starter is employed, and in emergency situations it is possible to bumpstart by running alongside the motorcycle with the manual clutch pulled in and transmission in the lowest gear that won't lock up the rear wheel, then hop on and pop the clutch as one hits the seat.

In off-road motorcycles, referred to as "trail" or "dirt" bikes customarily there is no electric starter to start the engine; instead, a kickstart foot lever operates through a primary gear on the clutch housing to rotate the crankshaft and start the engine very much like the hand crank employed in early model automobiles. When used in conjunction with an automatic clutch the kickstart lever imparts rotation directly to the outer basket or housing portion of the clutch via idler gears in a crankshaft set to the engine. Previously, at least in the automatic clutch versions, it was not possible to bumpstart by popping or manually engaging the clutch after getting up to speed.

It has been proposed in the past to utilize a central push rod in the clutch housing which when activated will release the friction plates in the clutch against spring pressure, representative patents being U.S. Pat. Nos. 4,518,070, 3,842, 954 and 3,215,234. Nevertheless, no practical way has been devised previously to mechanically engage the automatic clutch for purposes of bumpstarting it in emergency situations. Therefore, it is desirable to provide a simple but highly effective means of manually engaging an automatic clutch through the utilization of the existing clutch mechanism and specifically to employ a push rod in the reverse manner to cause the clutch plates to engage by forcing a series of rolling members out along an inclined surface or ramp to overcome the spring pressure normally retaining the clutch plates out of engagement. In this way, it is possible to bumpstart the engine by engaging the transmission gears, rolling the motorcycle along the ground to reverse the transmission from the rear wheel into the transmission shaft centrally of the clutch housing, followed by activating the push rod to engage the clutch and rotate the crankshaft through the primary driven gear in the clutch housing. Moreover, the automatic clutch will be normally disengaged at lower rpms or when the engine is idling and therefore not require manual disengagement each time that the motorcycle is slowed down or stopped.

In bumpstarting, it is important to understand that the initial turning or rotational movement required for rotation of the transmission shaft must be imparted by rotation of the rear wheel back through the gear reduction drive into the transmission shaft and which can be done simply by rolling or advancing the motorcycle along the ground. Secondly, it is necessary to shift the gearing from neutral into one of the gear positions, such as, second gear whereupon activation of the push rod to engage the clutch will impart rotation to the crankshaft and start the engine without the kickstarter.

Accordingly, there is a need for an emergency starting mechanism for automatic clutch type motorcycles and other applications as well but particularly for use in off-road vehicles which can employ the existing drive train of the motorcycle and impart the necessary turning force to start the engine without the assistance of a kickstarter or electric starter. Moreover in standard motorcycles there is a need for a clutch lockout so as to make automatic clutches feasible for use with electric starters.

SUMMARY OF THE INVENTION

It is therefore an object of the present invention to provide for a novel and improved method and means for bumpstarting an internal combustion engine which is highly dependable and effective in use while requiring a minimum of manual exertion or effort.

It is another object of the invention to provide for a push rod in combination with a centrifugal clutch which is capable of selectively engaging the clutch plates of an automatic clutch without imparting any centrifugal force to the clutch-engaging members.

It is a further object of the present invention to provide for a novel and improved clutch-engaging mechanism which requires minimal movement of an activating member to effect engagement of the clutch plates of an automatic clutch and wherein the starting mechanism is conformable for use with different types of existing automatic clutch mechanisms.

It is a still further object of the present invention to provide a manual control for an automatic motorcycle clutch, either in the form of a push rod or pull rod, which enables the clutch to remain in a normally released position when at low speeds or idling and can effect manual clutch for bumpstarting.

In accordance with the present invention, there has been devised a novel and improved manual control mechanism for an automatic clutch interposed between an engine crankshaft and a transmission shaft wherein the clutch is provided with an inner hub coupled to the transmission shaft and an outer cover coupled to the crankshaft with clutch members alternately extending from and fixed for rotation with said hub and said cover portion and being axially displaceable into and away from frictional engagement with one another, a clutch-engaging member at one end of the clutch members including spring means biasing said pressure plate away from the clutch members, and centrifugal force-responsive means movable radially and outwardly along said pressure plate to overcome the spring means and force the pressure plate axially against an endmost of the clutch members whereby to impart rotation between the basket and the hub, the mechanism comprising control member actuating means between one end of the control member and clutch-engaging member being movable in response to axial movement of the control member to displace the clutch-engaging member in an axial direction independently of the spring means, and manual control means for selectively advancing and retracting the control member in an axial direction whereby to manually control engagement and release of the clutch members independently of the speed of rotation of the clutch housing.

In a preferred form of invention, the manual control member is a push rod or pull rod for selectively engaging the clutch members by forcing the clutch-engaging member to overcome spring pressure and compress the clutch plates into firm frictional engagement so that the transmission shaft rotation is imparted to the crankshaft through the clutch housing. The clutch-engaging member may either take the form of a pressure plate within the clutch housing or the clutch housing itself in manually engaging the clutch to bumpstart the cycle.

In other modified forms of invention the push rod or control rod is employed in an automatic clutch to mechanically lock the clutch in a neutral position so that the clutch cannot be engaged without manually releasing the control rod; otherwise, when the control rod is depressed it will prevent the pressure plate from engaging the clutch plates and the clutch remains disengaged even when the engine reaches a speed that would normally cause the clutch to engage. If desired, a dual control mechanism may be utilized to releasably lock the clutch in a neutral position or to manually engage the clutch for bumpstarting the cycle.

There has been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIGS. 4 and 5 are side and front views of the inner hub of the preferred form of clutch of the present invention;

FIGS. 6 and 7 are front and side views of the basket and kickstarter gear of the preferred form;

FIGS. 8 and 9 are side and front views of the clutch cover of the preferred form;

FIGS. 10 and 11 are side and front views, respectively, of the clutch pressure plate of the preferred form;

FIG. 12 is an enlarged view partially in section of a modified form of clutch assembly in a neutral position, in accordance with the present invention;

FIG. 15 is a sectional view of still another modified form of invention utilizing a cam and pull rod manual control mechanism;

FIG. 16 is a view in detail of the cam and pull rod manual control mechanism shown in FIG. 15 showing the relationship between the cam and pull rod in the released position;

FIG. 17 is a sectional view of the form of invention shown in FIG. 16 illustrating the clutch in the engaged position;

FIG. 18 is another view in detail of the manual control mechanism showing the relationship between the cam and pull rod in the engaged position;

DETAILED DESCRIPTION OF PREFERRED EMBODIMENT

Figure 1:
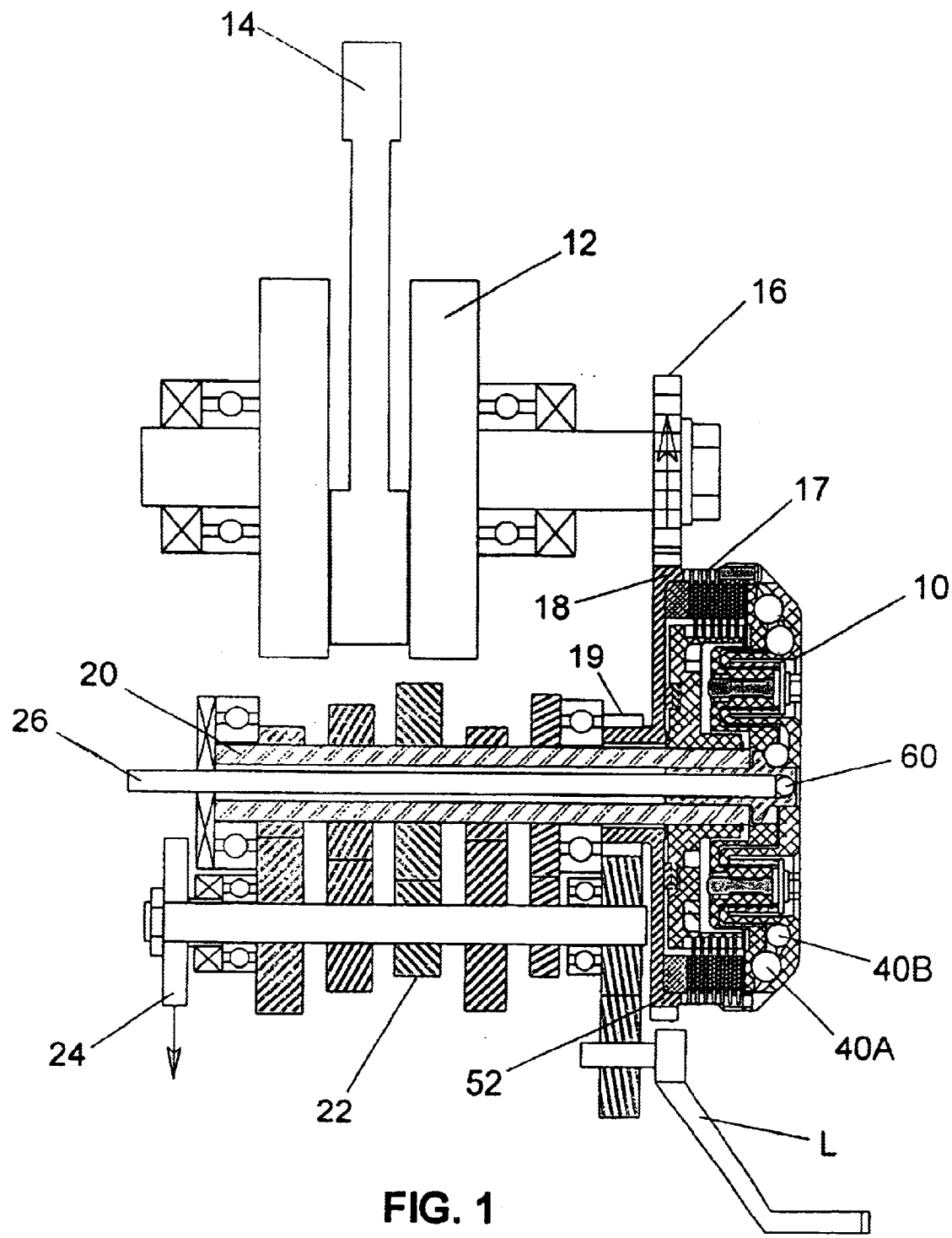
FIG. 1 is a schematic view of a preferred form of clutch assembly in combination with the standard drive train of a motorcycle.

There is shown by way of illustrative example in FIG. 1 the mounting of a preferred form of automatic clutch assembly 10 in the drive train of an off-road motorcycle wherein a crankshaft set 12 from the engine piston 14 imparts rotation to the power input side of the clutch 10 through a pinion 16 into primary drive gear 18 on clutch housing 17. A transmission shaft 20 is mounted for rotation by the clutch 10 when in the engaged position and through speed reduction gears represented at 22 to rotate the drive sprocket 24 of a chain drive, not shown, into the rear wheel of the bike. In accordance with the present invention, a push rod 26 extends through the transmission shaft 20 to manually engage the clutch plates to be hereinafter described for the purpose of bumpstarting the engine. The foregoing description of the drive train is intended more as a setting for the present invention inasmuch as there are numerous types of drive trains for motorcycles with which the push rod of this invention may be utilized.

Figure 2:
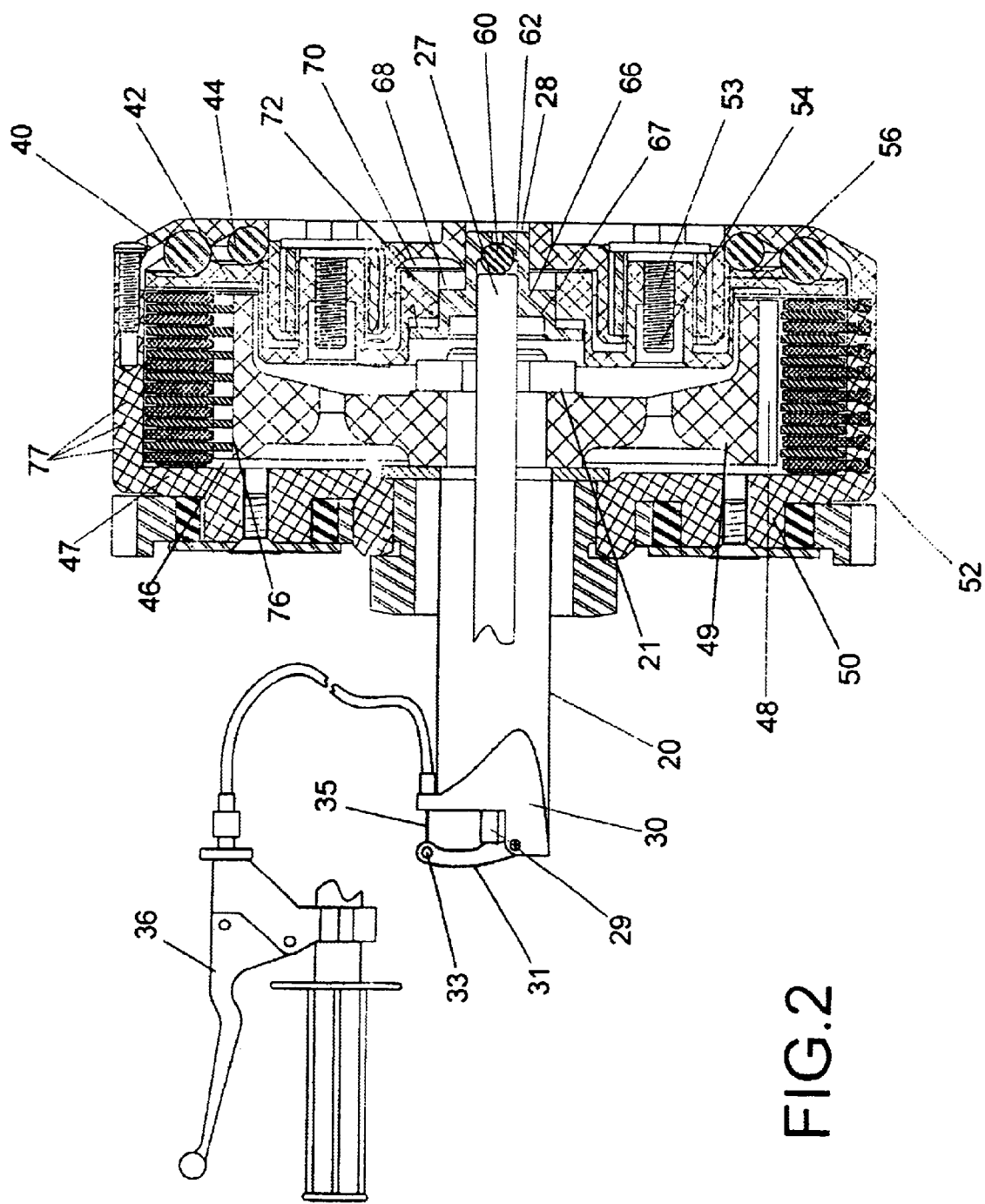
FIG. 2 is an enlarged view partially in section of the preferred form of clutch of FIG. 1 with a hand lever control in the released position.
Figure 3:
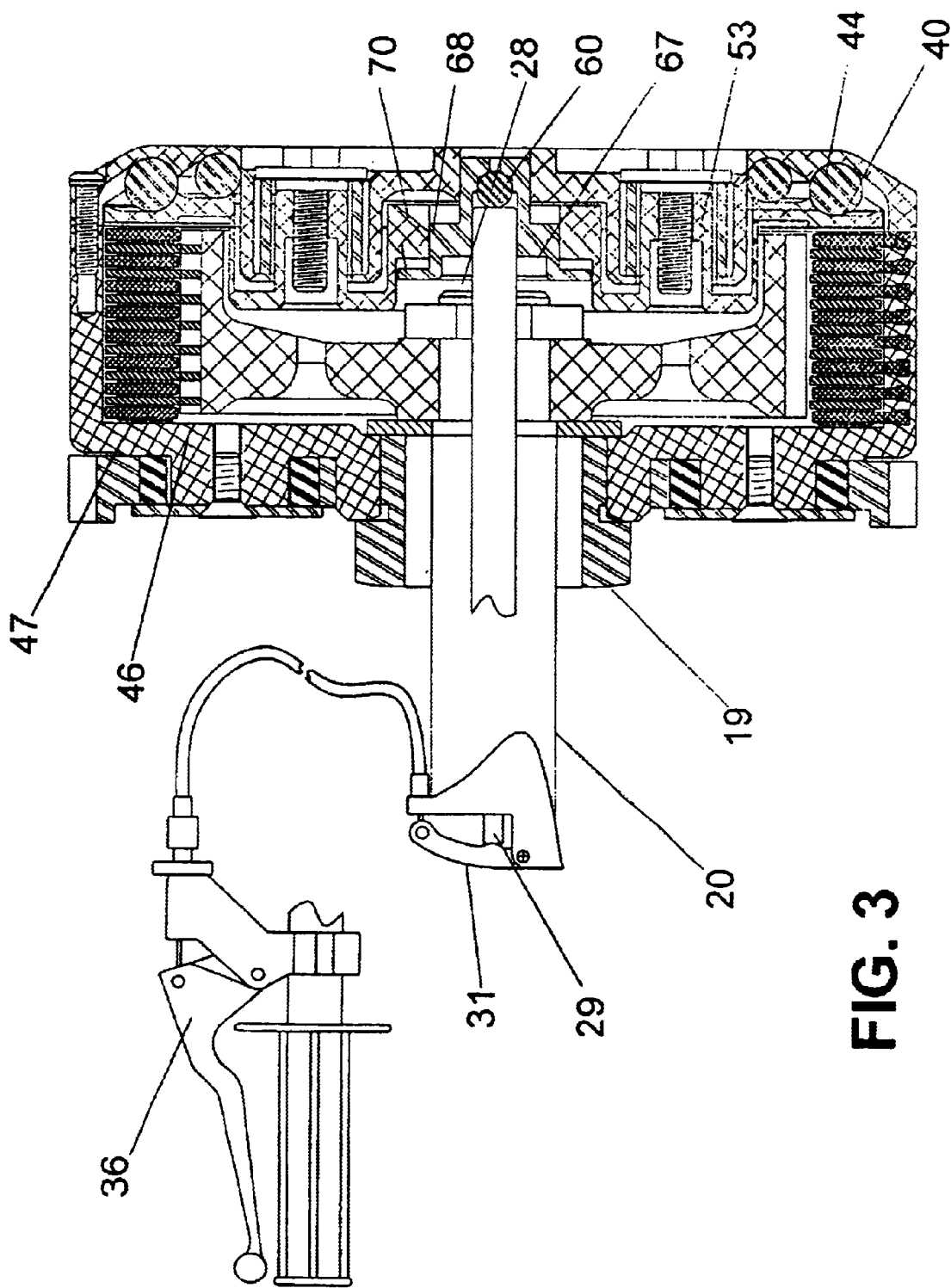
FIG. 3 is a view corresponding to FIG. 2 with the hand lever in the start or engaged position.

Referring to FIGS. 2 and 3, the push rod 26 is mounted for slidable movement through the end of the transmission shaft 20, a ball bearing 27 being journaled at a leading end of the rod and inserted in an actuator assembly 28 at the center of the clutch housing 17, and a trailing end 29 extends through a bracket 30 mounted on the end of the transmission shaft 20. The bracket 30 includes a pivotal arm 31 abutting the trailing end 29 of the push rod 26. A free end 33 is connected to a cable control wire 35 which is manually controlled by a hand lever 36 on the handlebar of the bike to advance and retract the push rod 26 with respect to the clutch assembly 10.

In the preferred form, the clutch assembly 10 is an automatic clutch having individual parts, as illustrated in FIGS. 4 to 11, including a radially outer series of circumferentially spaced roller members 40 interposed between a pressure plate 42 and a cover 44. The members 40 are responsive to centrifugal force to roll outwardly along radial slots 41 in the pressure plate 42 and aligned slots 43 in the cover 44 and to squeeze or compress together a series of radially inner and outer frictional clutch plates 46 and 47, respectively. In accordance with well-known practice, the inner metal plates 46 have inner tabs 76 which are axially slidable in grooves 48 in the outer wall of an inner hub 49, and the transmission shaft 20 is affixed to the inner hub 49 by a lock nut 21. The outer clutch plates 47 have extension tabs 77 which are slidable axially along circumferentially spaced axial grooves 51 on the inner wall of the outer cylindrical basket or housing 17, the latter defining an axial extension of the outer peripheral edge of the cover 44. The clutch plates 46 and 47 are sandwiched between the pressure plate 42 and an end wall 52 of the basket 17; and the pressure plate 42 is normally held away from the plates 46, 47 by a series of compression springs 53 mounted on bolts 54 between the cover 44 and recessed portions 56 in the pressure plate 42. The spring tension is regulated to resist radial outward movement of the roller members 40 and movement of the pressure plate 42 against the plates 46, 47 until the clutch 10 reaches a predetermined rotational speed imparted by the crankshaft 12 through the gear 18 once the engine has been started by the kickstarter lever L. Again, the construction and arrangement of clutch elements as just described is standard and for example is characteristic of the Kawasaki KX500 model clutch manufactured and sold by Kawasaki Motors Corp., U.S.A. of Irvine, Calif.

An important feature of the present invention resides in the actuator assembly 28 at the leading end 27 of the push rod. Preferably, the leading end 27 includes a ball 60 journaled therein and bearing against complementary bearing surfaces 62 projecting radially and inwardly from the end of an annular slide member 64 mounted in a center bore of the cover 44 and coaxial with and in outer surrounding relation to the push rod 26. An external shoulder 66 on the slide 64 has a tapered surface 67 which bears against a series of metal balls 68, preferably steel or other low-friction material. The balls 68 are movable along radial slots 70 on the inner wall of the cover 44 and aligned slots 73 in a tapered surface 72 of the pressure plate 42 so as to overcome the force of the springs 53 in response to advancement of the push rod 26 forcing the slide 64 forwardly in relation to the cover 44. As best seen from FIGS. 2 and 3, very slight movement on the order of 0.060" is required to displace the clutch-engaging pressure plate 42 the axial distance necessary to compress the clutch plates 46, 47 together and to effect complete clutch engagement. In this way, rotation of the transmission shaft 20 is then transmitted through the primary driven gear 18 on the clutch 10 to the crankshaft 12 in bumpstarting the engine. Once started and up to idling speed, the lever 36 can be released and the outer rollers 40 will have rolled into position maintaining the pressure plate 42 in firm engagement with the clutch plates 46,47.

In practice, the off-road cycles such as the trail or dirt bikes are often kickstarted as earlier described by the foot lever L rotating the kickstart gear 19 at the end wall 52 of the housing and thereby rotates the gears 16, 18 into the crankshaft 12 to start the engine. Once the engine is brought up to speed it will rotate the clutch housing 10 and pressure plate 42 at a high enough speed to force the roller members 40 outwardly by centrifugal force to compress the clutch plates 46 and 47 into close frictional engagement. In turn, this permits the power produced at the crankshaft 12 to be transmitted through the primary gear 16 to the transmission shaft 20 via suitable linkage, not shown, to the rear wheel which is typically a chain drive to transfer the turning motion of the transmission to the wheel. Bumpstarting in accordance with the present invention achieves the same end result but operates through the selective mechanical engagement of the clutch plates 46, 47 to rotate the crankshaft via the clutch housing after the desired transmission gear ratio is selected and the motorcycle rolled along the ground to reverse the transmission and rotate the inner hub 48 of the clutch 10.

DETAILED DESCRIPTION OF MODIFIED FORMS OF INVENTION

Figure 13:
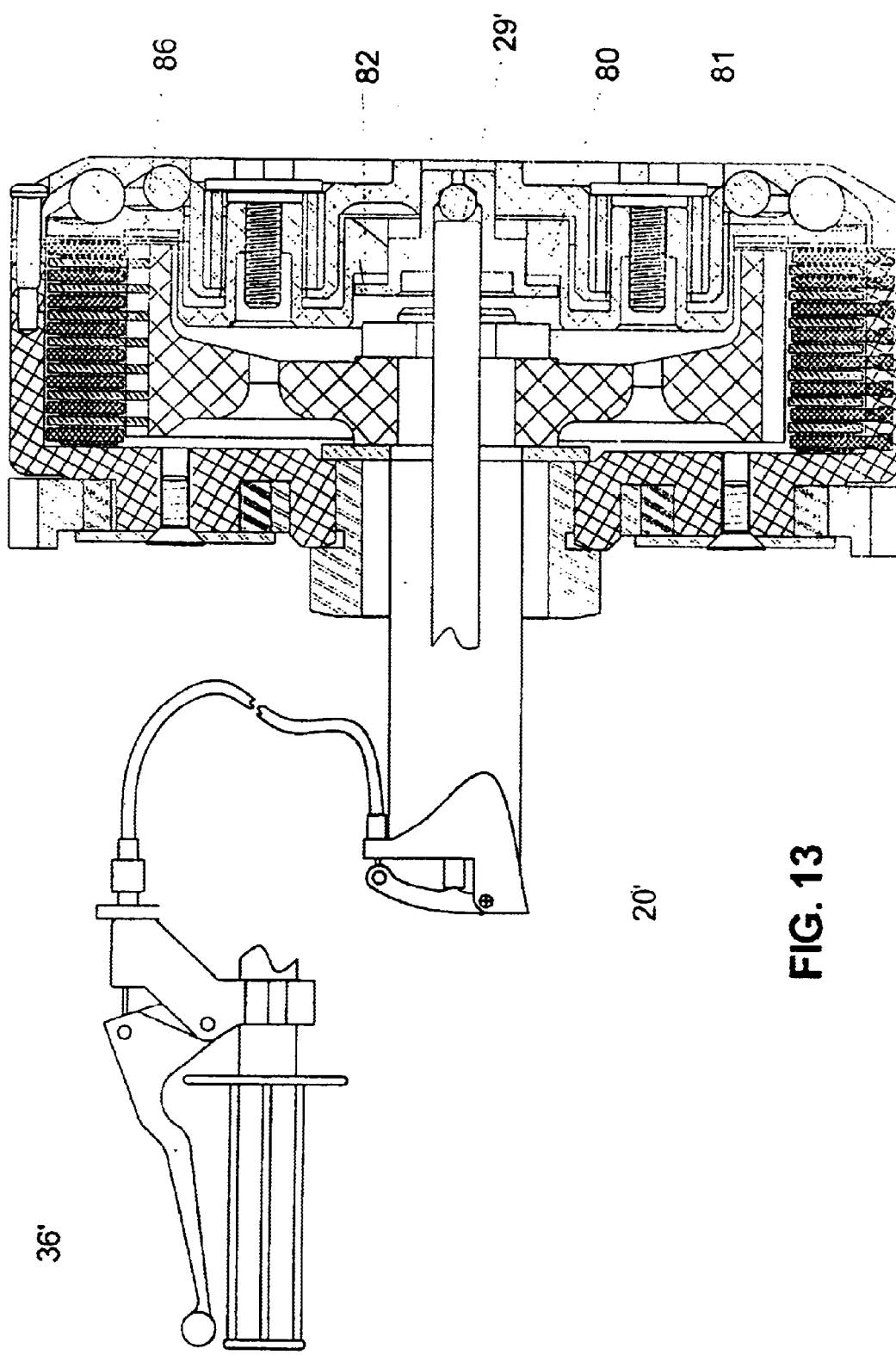
FIG. 13 is an enlarged view of the assembly of FIG. 12 shown in the engaged position.

A modified form of invention is illustrated in FIGS. 12 and 13 wherein like parts to those of the preferred form are correspondingly enumerated with prime numerals. The modified form is intended for use as a safety device to mechanically lock the clutch in neutral position so that the motorcycle or other vehicle cannot advance or take off until the push rod 26' is positively released by releasing the lever 36'. Even then, it is necessary for the engine to rotate the clutch at a speed which will enable the outer rollers 40' to force the clutch plates 46', 47' into engagement. A notable distinction in the actuating mechanism is that the slide 80 has an external shoulder 81 with little or no taper and is designed to move directly into engagement with a flat end surface 82 of an inner radial portion of the pressure plate 86 thereby to force the pressure plate 86 away from engagement with the clutch plates 46', 47' when the lever 36' is depressed, as shown in FIG. 13. When the control lever 36' is released, as shown in FIG. 12, the pressure plate 86 will compress the clutch plates 46', 47' under the urging of the rollers 40' only when the engine gets up to speed to a sufficient extent to force the rollers 40' outwardly and overcome the force of the springs 53'. The modified form as herein described enables the use of an automatic clutch on a bike which employs an electric starter and can be bumpstarted in the conventional manner. The automatic clutch is of course substituted for the stock or manual clutch typically employed in a bike and accordingly the existing clutch lever on the handlebar can serve as the release lever 36' for the push rod 20'.

While the preferred and modified forms of inventions have been described in connection with motorcycles it will be evident that they are conformable for use in various other applications which employ a motive power source, such as, an electric motor or internal combustion engine including but not limited to other vehicles, such as, drag racing, cars, trucks, tractors, go-carts, cement mixers and all-terrain vehicles, and power tools including chain saws and weedeaters and virtually any application in which an automatic clutch can be utilized. Furthermore, as illustrated in FIG. 1, multiple rows of balls as designated at 40a and 40b may be employed in outer races between the pressure plate 42 and cover 44; and as indicated earlier the roller members 40 of FIGS. 2 and 3 either may be cylindrical or spherical.

Figure 14:
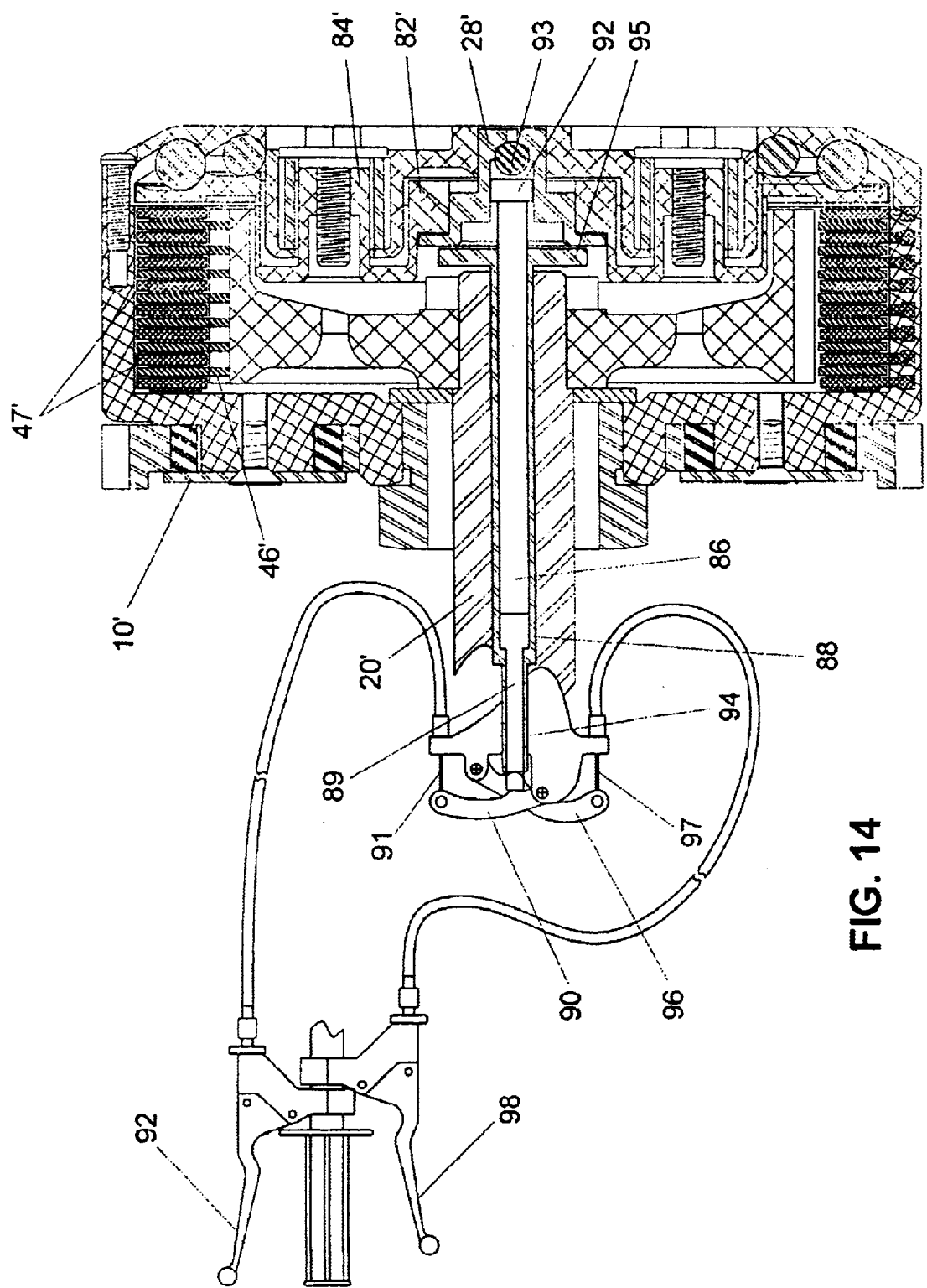
FIG. 14 is a sectional view of a modified form of invention showing a dual control mechanism for an automatic clutch.

Still another modified form of invention is shown in FIG. 14 comprising a dual control mechanism having an inner concentric push rod 86 slidable through outer concentric push rod 88, both push rods 86 and 88 being slidable centrally of transmission shaft 20' of an automatic clutch 10'. The push rod 86 is made up of a solid rod portion projecting through the greater length of the tubular rod 88 and has a rod-like end portion 89 projecting through the end of the tubular portion 88 as well as the transmission shaft 20 for engagement by a pivotal arm 90. The arm 90 is manually controlled through a cable control wire 91 by a hand lever 92 in the same manner as described with reference to the control lever 36 of FIGS. 2 and 3. The opposite end of the push rod 86 has an enlarged end 92 and a ball bearing 93 journaled on the leading end 92 and inserted in actuator assembly 28'.

The outer concentric member 88 is of elongated tubular construction having a reduced tubular end portion 94 at its trailing end and has a leading end projecting through the leading end of the transmission shaft 20' to terminate in an enlarged, disk-shaped portion 95 between the end of the transmission shaft 20' and the actuator assembly 28'. A pivotal arm 96 is connected to a cable control wire 97 from a hand lever 98. The pivotal arm 96 is bifurcated so as to straddle the arm 90 and bear against the trailing end of the tubular portion 94. As in the modified form of FIGS. 12 and 13, when the tubular control member 88 is axially advanced through the transmission shaft 20' by depression of the control lever 98, it will cause the end portion 95 to engage flat end surface 82' of the pressure plate 84' to mechanically lock the pressure plate 84' in neutral position as described with reference to FIGS. 12 and 13. Once again, as in the preferred form of FIGS. 1 to 3, the engine can be bumpstarted by depressing the control lever 92 to advance the push rod 86 and cause the pressure plate 84' to compress the clutch plates 46' and 47' into engagement with one another in bumpstarting the engine. It is important to recognize that only one of the control levers 92 and 98 can be depressed depending upon whether it is desired to lock the clutch in a neutral position or to bumpstart the engine. For this reason, the dual control mechanism would have principal utility in off-road motorcycles having electric starters or in racing bikes in which the clutch must remain disengaged even when the engine rpm exceeds that normally required to cause automatic clutch engagement.

FIGS. 15 to 18 illustrate still another modified form of invention for an automatic clutch 110 having a standard transmission shaft 120 and where from space considerations it is necessary or at least desirable to mount the bumpstart control mechanism at the opposite end of the clutch housing to that of FIGS. 1 to 3. For this purpose, the control mechanism is mounted in a cup-shaped end 100 of a cover plate 101 at the end of the clutch opposite to the transmission shaft 120. The control mechanism is broadly comprised of a pull rod 102 mounted at one end in a bearing 103 in an actuator sleeve 128 in the end plate 144 of the clutch. The actuator 128 has a beveled shoulder 167, and a series of balls 168 are movable along radial slots on the inner wall of the end plate 144 as well as aligned slots in a tapered surface of the pressure plate 142. Accordingly, as in the preferred form of FIGS. 1 to 3, when the slide member 128 is urged in a direction toward the cover 101 the balls 168 will be forced in an outward radial direction, overcoming the force of the springs 153 to cause the pressure plate 142 to compress the clutch plates 146 and 147 together to complete manual engagement of the clutch.

The forward or leading end of the pull rod 102 has an external flange or shoulder 104 to interengage with the notched portion 105 in a cam 106 on a control arm 107. As best seen from FIGS. 16 and 18, the control arm 107 is mounted at the end of a shaft 108 which is journaled within the cup-shaped recess 100, and a control cable 135 extends from a hand control lever 136 on the handlebar of the cycle to control axial movement of the pull rod 102. Thus, in the released position shown in FIG. 15, the balls are normally forced to a radial inward position by the spring elements 153. When the lever 136 is manually depressed, the cable 135 will rotate the control arm 107 causing the notched portion 105 of the cam 106 to bear against the shoulder 104 and cause the pull rod 102 to be axially displaced along with the slide member 128 thereby forcing the balls 168 radially outwardly to compress the pressure plate 142 against the plates 146 and 147 as earlier described.

Figure 19:
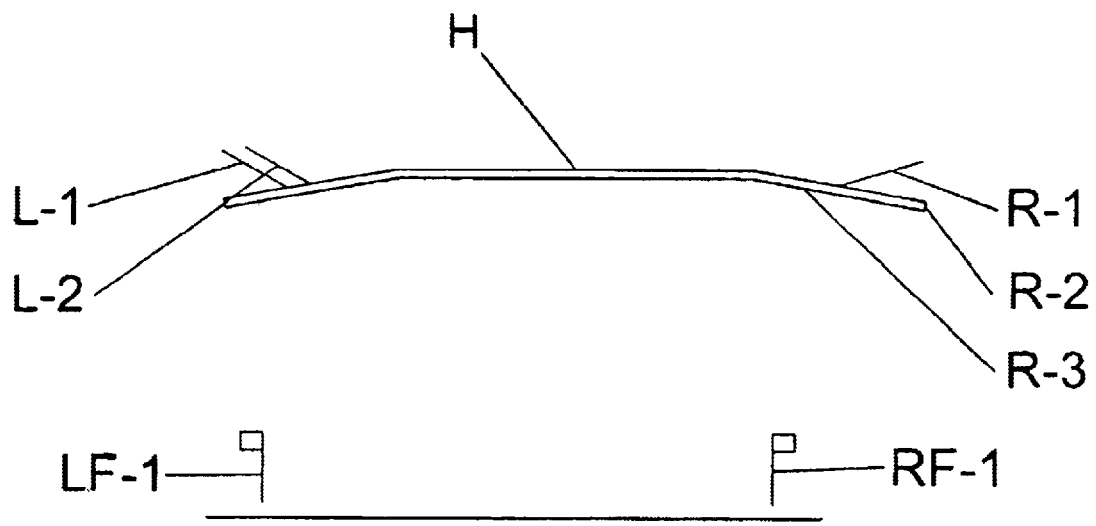
FIG. 19 is a somewhat diagrammatic view of the conventional location of hand and foot control levers for a motorcycle with a manual clutch.

Although the different forms of invention shown in FIGS. 1 to 18 illustrate the bumpstart and other control levers as being mounted on the handlebar, it will be apparent that the control levers can be mounted at different locations within reach of the operator, such as, a pushbutton on the dashboard or a foot control lever. A particular advantage of the present invention is the ability to eliminate the clutch control lever which in the conventional motorcycle is placed on the lefthand of the handlebar H. For example, FIG. 19 illustrates a conventional control system for a bike with standard clutch and which includes a clutch control lever L-1 and compression lever L-2 on the left hand. A front brake control lever R-2, throttle R-2 and electric starter R-3 are on the right hand. A gear shift control LF-1 is on the left foot and rear brake control RF-1 is on the right foot.

Figure 20:
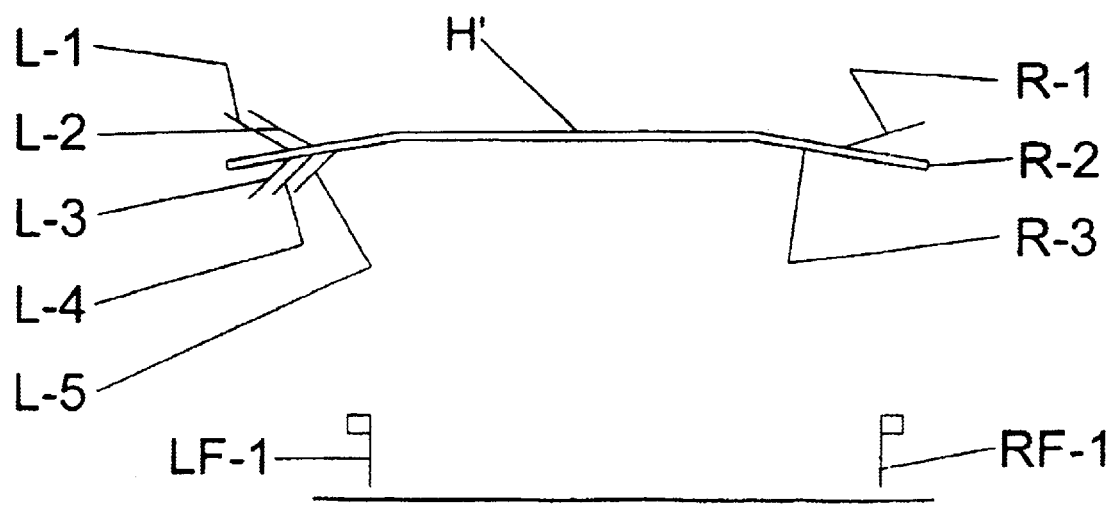
FIG. 20 is a somewhat diagrammatic view of the hand and foot control locations for a motorcycle with a clutch mechanism of the present invention.

In accordance with the present invention, FIG. 20 illustrates a motorcycle with electric starter and automatic clutch with the same foot controls as in FIG. 19 as well as the right hand controls. However, in place of the clutch control lever illustrated in FIG. 19, various controls may be positioned on the left hand of the handlebar H' including rear brake L-1, compression release L-2, gear shift L-3, bumpstart L-4 and neutral start L-5. For example, the rear brake control L-1 may be placed on the left hand grip of the handlebar along with the bumpstart lever L-4, since the bumpstart lever is activated only in starting and not in slowing down when the brake or brakes would be applied. Accordingly, it is possible to control both the front and rear brakes by hand control which is most desirable in racing so as to leave the feet free for guiding or balance. Thus, in the absence of the clutch control lever on the handlebar, one or more of the hand control levers L-1 to L-5 on the left hand or right hand of the handlebar H' are individually controlled.

It is therefore to be understood that while preferred and modified forms of invention have been herein set forth and described the above and other modifications and changes may be made without departing from the spirit and scope of the present invention as defined by the appended claims and reasonable equivalents thereof.

We claim:

1. A manual override mechanism for an automatic clutch disposed between a crankshaft of an engine and a transmission shaft wherein said clutch is provided with an inner hub coupled to said transmission shaft, an outer housing coupled to said crankshaft, frictional clutch members alternately extending from and fixed for rotation with said hub and said housing and being axially displaceable into and away from frictional engagement with one another, a pressure plate at one end of said clutch members including spring means biasing said pressure plate in an axial direction away from said clutch members, and centrifugal force-responsive means movable radially and outwardly along said pressure plate to overcome said spring means and force said pressure plate axially against an endmost of said clutch members whereby to impart rotation between said housing and said hub, the combination therewith comprising:

an elongated control rod extending centrally of said housing and being axially slidable with respect to said housing;

actuating means between one end of said rod and said pressure plate being movable in response to axial movement of said rod to displace said pressure plate in an axial direction independently of said spring means; and manual control means for selectively advancing and retracting said rod in an axial direction whereby to manually control engagement and release of said clutch members independently of the speed of rotation of said clutch.

2. A mechanism according to claim 1 wherein said actuating means includes roller members and guide slots in said pressure plate through which said roller members are advanced.

3. A mechanism according to claim 2 wherein said roller members are metal balls.

4. A mechanism according to claim 2 wherein said roller members are cylindrical metal pins.

5. A mechanism according to claim 1 wherein said actuating means includes an axially displaceable annular member in surrounding relation to said rod and fixed for axial displacement with said rod, said annular member having an external shoulder to impart the axial advancement of said rod to said pressure plate.

6. A mechanism according to claim 5 wherein said rod is defined by a push rod extending centrally through said transmission shaft.

7. A mechanism according to claim 5 wherein said rod is defined by a pull rod extending from one end of said clutch housing opposite to said transmission shaft into engagement with said actuating means.

8. A mechanism according to claim 1 wherein said actuating means is operative to displace said pressure plate in a direction opposed to said spring means whereby to cause engagement of said clutch members at any speed from zero up to the speed required for said centrifugal force-responsive means to cause said clutch members to frictionally engage and impart rotation between said housing and said hub.

9. A mechanism according to claim 1 wherein said actuating means is operative to lock said pressure plate against axial displacement into engagement with said clutch plates.

10. A mechanism according to claim 9 wherein said actuating means includes an external shoulder directly engageable with said pressure plate.

11. A mechanism according to claim 10 wherein said manual control means includes a hand lever and cable connected to one end of said push rod.

12. A manual override mechanism for an automatic clutch disposed between a crankshaft of an engine and a transmission shaft wherein said clutch is provided with an inner hub coupled to said transmission shaft and an outer cover portion coupled to said crankshaft, frictional clutch members alternatively extending from and fixed for rotation with said hub and said cover portion and being axially displaceable into and away from frictional engagement with one another, a pressure plate at one end of said clutch members including spring means biasing said pressure plate in an axial direction away from said clutch members, and centrifugal force-responsive means movable radially and outwardly along said pressure plate to overcome said spring means and force said pressure plate axially to compress said clutch members together whereby to impart rotation between said basket and said hub, the combination therewith comprising:

an elongated control rod extending centrally of said housing through said transmission shaft, said rod being axially slidable with respect to said shaft;

actuating means between one end of said rod and said pressure plate including roller members being movable between said pressure plate and said cover in response to axial movement of said rod to displace said pressure plate in an axial direction opposed to said spring means; and manual control means for selectively advancing and retracting said rod in an axial direction whereby to manually control engagement and release of said clutch members independently of the speed of rotation of said clutch.

13. A mechanism according to claim 12 wherein said roller members are movable through guide slots in said pressure plate.

14. A mechanism according to claim 13 wherein said roller members are metal balls.

15. A mechanism according to claim 13 wherein said roller members are cylindrical metal pins.

16. A mechanism according to claim 12 wherein said actuating means includes an axially displaceable annular member in surrounding relation to said push rod and fixed for axial displacement with said push rod, said annular member having an external shoulder to impart the axial advancement of said push rod to said pressure plate.

17. A mechanism according to claim 16 wherein said roller members are urged radially and outwardly by said shoulder to advance along guide slots in said pressure plate to force said pressure plate axially against said clutch members.

18. A mechanism according to claim 12 wherein a ball member is journaled at said leading end of said push rod, and said actuating means includes a bearing surface engageable with said ball member.

19. In an automatic clutch for a motorcycle having frictional clutch members alternately extending from and fixed for rotation with radial inner and outer drive and driven portions and being axially displaceable into and away from frictional engagement with one another, an axially displaceable clutch-engaging member at one end of said clutch members including spring means biasing said clutch-engaging member in an axial direction away from said clutch members, a limit stop at an end opposite to said clutch-engaging member, and centrifugal force-responsive means movable radially and outwardly along said clutch-engaging member to overcome said spring means and force said clutch-engaging member axially against an endmost of said clutch members whereby to impart rotation between said inner and outer drive and driven portions, the combination therewith of a manual override mechanism comprising:

an elongated push rod extending centrally of said clutch members and being axially slidable with respect to said clutch-engaging member;

actuating means between one end of said push rod and said clutch-engaging member being movable in response to axial movement of said push rod to displace said clutch-engaging member in an axial direction independently of said spring means; and manual control means for selectively advancing and retracting said push rod in an axial direction whereby to manually control engagement and release of said clutch members independently of the speed of rotation of said clutch.

20. In an automatic clutch according to claim 19, wherein said frictional clutch members are of annular configuration.

21. In an automatic clutch according to claim 19 wherein said clutch-engaging member is in the form of an annular disk.

22. In an automatic clutch according to claim 19 wherein said limit stop is defined by an end wall of said clutch.

23. In an automatic clutch according to claim 19 wherein said centrifugal force-responsive means includes a plurality of circumferentially spaced metal balls.

24. In an automatic clutch according to claim 19 wherein said centrifugal force-responsive means includes roller members and guide slots in said clutch-engaging member through which said roller members are advanced.

25. In an automatic clutch according to claim 24 wherein said roller members are defined by metal balls.

26. In an automatic clutch according to claim 25 wherein said clutch-engaging member is in the form of an annular disk and said actuating means includes a slide member in surrounding relation to said push rod and movable with said push rod, said slide member having an external shoulder to force said ball members radially outwardly in a direction causing said pressure plate to compress said clutch members together.

27. In an automatic clutch according to claim 19 wherein said actuating means is operative to displace said pressure plate in a direction opposed to said spring means whereby to cause engagement of said clutch members at any speed from zero up to the speed required for said centrifugal force-responsive means to cause said clutch members to frictionally engage and impart rotation between said housing and said hub.

28. In an automatic clutch according to claim 19 wherein said actuating means is operative to lock said pressure plate against axial displacement into engagement with said clutch plates.

29. In an automatic clutch according to claim 28 wherein said actuating means includes an external shoulder directly engageable with said pressure plate.

30. In an automatic clutch according to claim 19 wherein said manual control means includes a control lever accessible to an operator of the motorcycle.

31. In an automatic clutch according to claim 30 wherein said motorcycle has front and rear brakes, and left and right hand brake control levers mounted on a handlebar of said motorcycle.

32. A manual override control mechanism for an automatic clutch of a motorcycle disposed between a crankshaft of an engine and a transmission shaft wherein said clutch is provided with an inner hub coupled to said transmission shaft, and an outer housing and cover portion are coupled to said crankshaft, frictional clutch members alternatively extending from and fixed for rotation with said hub and said cover portion and being axially displaceable into and away from frictional engagement with one another, a pressure plate at one end of said clutch members including spring means biasing said pressure plate in an axial direction away from said clutch members, and centrifugal force-responsive means movable radially and outwardly along said pressure plate to overcome said spring means and force said pressure plate axially to compress said clutch members together whereby to impart rotation between said housing and said hub, the improvement comprising:

a first control rod extending centrally of said housing through said transmission shaft, said first control rod being axially slidable with respect to said shaft;

actuating means between one end of said first control rod and said pressure plate including roller members being movable between said pressure plate and said cover in response to axial movement of said first control rod to displace said pressure plate in an axial direction opposed to said spring means;

a second control rod extending through said transmission shaft having a pressure plate-engaging portion thereon;

first manual control means for selectively advancing said first control rod into engagement with the said actuating means whereby to displace said pressure plate in an axial direction opposed to said spring means; and second manual control means for selectively advancing said second control rod to a position in which said pressure plate-engaging portion prevents movement of said pressure plate into a clutch-engaging position.

33. A mechanism according to claim 32 wherein said second control rod is of tubular configuration and is concentrically mounted between said first control rod and said transmission shaft.

34. A mechanism according to claim 33 wherein said pressure plate-engaging portion is in the form of an annular disk at one end of said second control rod.

35. A mechanism according to claim 32 wherein a ball member is journaled at a leading end of said first control rod, and said actuating means includes a bearing surface engageable with said ball member.

36. A mechanism according to claim 32 wherein said first manual control means includes a first hand control lever on a handlebar of said motorcycle.

37. A mechanism according to claim 32 wherein said second manual control means includes a second hand control lever mounted on a handlebar of said motorcycle.

38. A mechanism according to claim 32 wherein said first manual control means and said second manual control means each includes a hand control lever mounted on a handlebar of said motorcycle.

39. A mechanism according to claim 38 wherein said motorcycle includes front and rear brakes, and a hand control lever on said motorcycle for controlling each of said front and rear brakes.

\* \* \* \* \*